United States Patent Office 3,583,064
Patented June 8, 1971

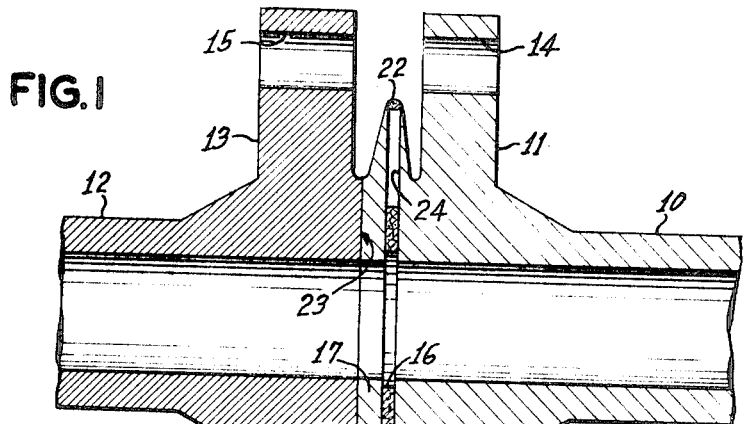
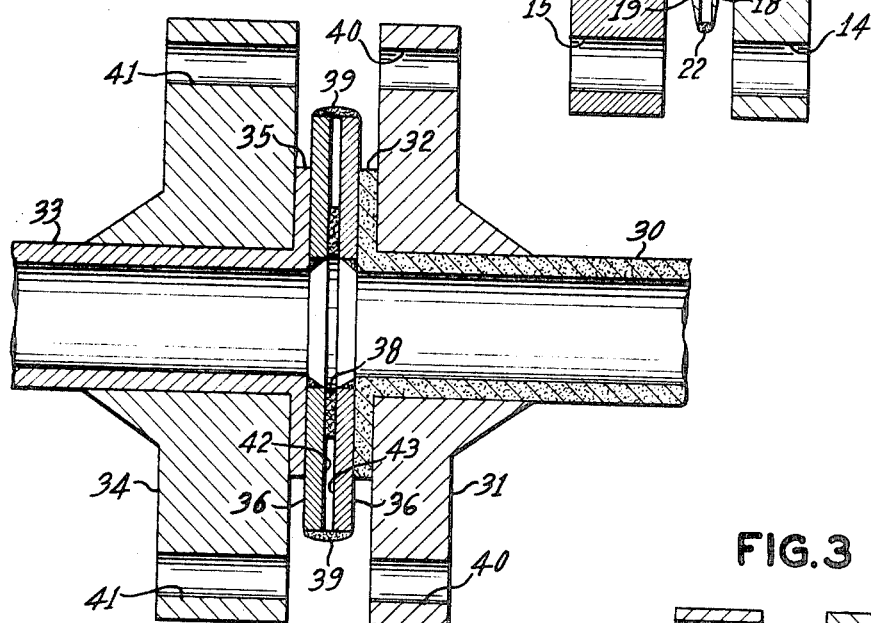
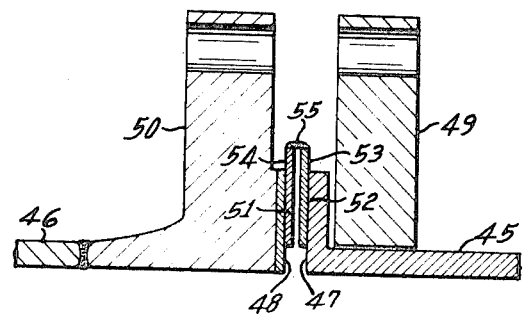
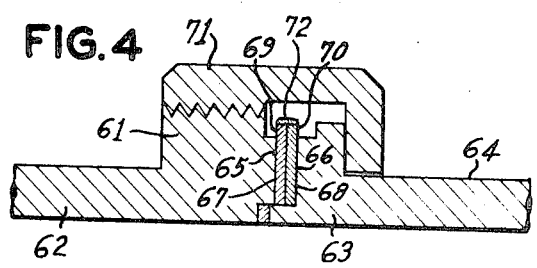

3,583,064
TRANSITION PIPING JOINT
Joseph V. Costello, Williston Park, and Lawrence A. Zeis, Levittown, N.Y., assignors to Pullman Incorporated, Chicago, Ill.
Continuation-in-part of abandoned application Ser. No. 630,721, Apr. 13, 1967. This application July 7, 1969, Ser. No. 842,804
Int. Cl. B23k *31/02*
U.S. Cl. 29—471.7  12 Claims

ABSTRACT OF THE DISCLOSURE

A transition piping joint between piping of weldably incompatible materials and method for joining weldably incompatible conduits which comprises bonding a first collar of dissimilar material to the first conduit, said collar material having a percent elongation of at least 3% and coefficient of expansion independent of that of the conduit, welding the first collar to a second weldably compatible collar joined to the second conduit and composed of a material having a melting point which varies not more than 20% from that of the material of the first collar.

---

This application is a continuation-in-part of U.S. application Ser. No. 630,721, filed Apr. 13, 1967, now abandoned.

This invention relates to transition piping joints. In one aspect, this invention relates to piping joints between piping or conduits of dissimilar materials in which the joint is leakproof and easily assembled. In a more specific aspect, this invention relates to flange and to union type joints or conduits of dissimilar materials.

In commercial installations, it is frequently desirable to employ conduit or piping of a specific material or specification up to a certain point in the system and from that point to use piping of a different material or specification. For example, in cryogenic applications, aluminum piping may be used in preference to piping of other materials up to a certain point within the system after which higher strength piping, such as stainless steel, may be required. In other instances, up to a certain point within the system, it may be desirable to use plastic-lined piping with the use of unlined pipe becoming desirable thereafter. Points within a system where change is made from one material or specification piping to another are known as transition points and the piping joint employed at that point is known as a transition piping joint.

Transition piping joints are frequently subjected to severe stresses. Heretofore it has been held that differences in the coefficients of expansion of the materials employed cause failure of such joints. Actually, during operation, shearing stresses are set up which act within the joint to produce failure, and in certain cases involving a flanged joint, one of the flanges may contract under the lower temperatures involved to the extent that the bolts, stressed when making the connection under ambient temperature, loosen in the joint and permit leakage between the faces of the flanges.

Transition from one piping material to another is effected in numerous ways. Transition couplings can be used but these generally are of the brazed type and, accordingly, may possess inadequate shear strength in applications involving superatmospheric pressures. While soldering, brazing or bonding may be employed between the two dissimilar metals, such joints are frequently susceptible to corrosion and the permanency of such a joint does not permit ready disassembly for purposes of cleaning and inspection.

There are commercially available several kinds of flange transition piping joints but all of these have serious limitations. One available joint, for example, is designed for joining aluminum piping to stainless steel piping. This joint employs a transition ring in which stainless steel is bonded under pressure to aluminum. Moreover, this joint cannot be disassembled. Other joints are available, but these inherently possess disadvantages which curtail their usage.

Accordingly, it is the object of this invention to provide a transition piping joint which is easily assembled or disassembled.

It is another object of this invention to provide a transition piping joint which has a satisfactory resistance to stresses set up within the joint due to the dissimilarity of the coefficients of expansions of the metals involved.

It is a further object of this invention to provide a transition piping joint which is capable of withstanding subatmospheric or superatmospheric pressures at subatmospheric and superatmospheric temperatures.

It is yet another object of this invention to provide a transition joint which is suitable for use with a wide variety of materials, but which is not susceptible to failure under widely varying operation conditions.

Another object is to provide a transition pipe joint which is not only leakproof but which is also easily separable and reweldable.

Still another object is to provide a transition joint which can be dismantled and reassembled on location for periodic cleaning and testing of the conduits attached to said joint.

These and other objects of the invention will become apparent from the following description and disclosure.

According to this invention a transition joint having two mating facings is provided for weldably incompatible piping wherein the material comprising at least a portion of one of the mating facings has an elongation of at least 3 percent and is weldably compatible to the material comprising at least a portion of the other mating facing, i.e., the metallic material of the first mating surface having a percent elongation which is similar to that of the second mating facing in that both have at least 3 percent elongation and having a melting point which varies not more than 20 percent from that of the second mating facing material. At least one of said mating facings is joined, e.g. by bonding, to at least one of the weldably incompatible conduits and the other facing is joined to the second conduit or the second conduit can be designed so that one of its terminal portions provides the second mating facing which is weldable to the first mating facing. The mating facings of the present invention are preferably designed to extend radially from and circumferentially to the conduit to form lips or collars which are suitably disposed for welding together around their outer periphery to provide a leakproof seal which is supported by mechanical means.

An improvement of the present invention is realized in providing a weldable joint between weldably incompatible conduits. Heretofore, such conduits have been joined by bonding or by employing a mechanical locking device; however, locking devices are not satisfactory since they do not provide a leakproof joint and bonding requires offsite replacement for cleaning of process flow lines which, in process involving corrosive or mixed phase fluids, occurs frequently. Wherever possible, it is preferable to use welded surfaces in piping installations. Since by welding, the molecules of one metal under applied heat and/or pressure are dispersed and associated with the molecules of the second metal of the welding material, the seal obtained is an integral, leakproof union resistant to cracking. Although the welded seal provides a leakproof union, it is relatively easy to disassemble and repair by rewelding for onsite cleaning or testing of piping.

Mating facings are any two geometrically compatible surfaces in actual contact or in gasketed relationship such as the parallel surface relationships employed in flanged joints or receptive surface relationships employed, for example, in piping unions. Gasketing may be interposed between the mating facings, if desired.

In piping joints of this invention, the welded mating surfaces are supported by a fastening mechanism which holds the welded surfaces in abutment. In flanged joints, the lips or collars terminate at their outer periphery within the bolt positions of the flanges. In piping unions of this invention, the lips or collars terminate at their outer periphery within the ring or nut of the union. It is also within the scope of this invention to employ mechanical clamping means which engage the non-welded surfaces of the lips at the base where the lip is joined to the conduit, in which case the outer periphery of the lips can terminate outside the point where the mechanical fastening device engages the lips or collars.

The first mating surface, e.g., the collar or lip, which is bonded, brazed or soldered to one of the weldably incompatible conduits can be composed of the same or a different material as that of the mating surface on the second conduit. When mating surfaces of different compositions are employed, it is important that the surfaces be weldably compatible as defined above. In order to withstand stresses of normal operation, the mating surface material should possess an elongation of at least 3 percent and an elongation of 10 percent is preferable. In selecting weldably compatible materials, it has been found that the elongation and the melting point (M.P.) of the metals, and not necessarily the coefficient of expansion, are the important properties which determine weldability. The following Table I provides specific examples of weldably compatible and weldably incompatible metals:

TABLE I

Examples of metals having similar coefficients of expansion but different melting points—weldably incompatible when melting points vary more than 25 percent.

| Metal | Commercial Name | Coeff., microinches/ inch/° C. | M.P. ° C. |
|---|---|---|---|
| Al | Alclad 17 ST | 21.96 | 538-560 |
| Al | Al-Silicone 43 | 21.96 | 577-630 |
| Cu | Admiralty | 20.16 | 935 |
| Pb | Pb-Sb alloy | 19.5 | 250 |
| Zn | Alloy of Zn and Cu (solder white) | 21 | 840 |
| Al | Magnalium | 24 | 600 |
| Al | Cu Lynite, body alloy | 26 | 610-650 |
| Pb | Antimonial lead | 27 | 245-90 |
| Pb | Chemical lead | 28.98 | 327 |
| Pb | Solder Half and Half | 24 | 225 |
| Zn | Alloy of Zn-Al | 28 | 380 |
| Ni | Hastelloy | 11.59 | 1,160 |
| Ni | Nichrome casting | 12.1 | 970 |
| Fe | Steel | 12.0 | 1,430 |

Examples of metals having similar melting points but different coefficients of expansion—weldably compatible

| Al | Magnalium | 24 | 600 |
|---|---|---|---|
| Mg | Dowmetal R | 0.000027 | 604 |
| Steel | | 12 | 1,430 |
| | Sterling Stainless T | 9.99 | 1,430 |

The following Table II lists types of materials which are most frequently used in services requiring a leakproof joint which must be subjected to frequent disassembly. The expansion coefficient is given in microinches per inch per degree centigrade and the melting point is given in degrees Rankine.

TABLE II

| Group | Metal | Expansion coefficient | Absolute melting point |
|---|---|---|---|
| A | Aluminum and aluminum alloys | 19-24 | 1,510-1,675 |
| A | Copper and copper alloys | 16.5-21 | 1,860-2,390 |
| A | Austenitic alloy steels | 16-19 | 2,960-3,060 |
| B | Austenitic alloy steels | 16-19 | 2,969-3,160 |
| B | Iron and ferritic alloy steels | 10-11 | 3,260 |
| B | Nickel and nickel alloy steels | 10-17 | 2,760-3,260 |
| C | Aluminum and aluminum alloys | 19-24 | 1,510-1,675 |
| C | Iron and ferritic alloy steels | 10-11 | 3,260 |

NOTE.—Group A materials which have similar coefficients of expansion, but melting points which differ more than 20% are not weldable to each other; Group B materials which have different coefficients of expansion and similar melting points are weldable to each other; Group C materials have different coefficients of expansion, different melting points, and are not weldable to each other.

Heretofore several techniques have been suggested to provide a solution to the problem of direct welding the incompatible metals listed above. However, these suggested procedures have failed to provide a remedy since the welds or bonding obtained crack under normal operational stresses and strains. This failure of the joint usually occurs when the ductility of the weld is less than 5 percent after welding. In these cases, the welding operation causes degradation of one or both of the metals joined as evidenced by phase changes, liquation or oxidation of the metal or metals adjacent to the weld metal.

The transition joint of the present invention can be composed of a material which is weldable to one of the conduits and bondable to the other conduit which is weldably incompatible with both the joint and the first conduit. In the case where the conduit to which the joint is weldable provides a mating surface which can be aligned for welding with the mating surface of the joint, the joint can be welded at one end to the first conduit and bonded at its opposite end to the second conduit while retaining the advantage of providing a joint which can be disassembled and rewelded without undue operational cost. More often, however, the joint comprises two mating surfaces, of the same or different composition, each of which is joined to one of the conduits, e.g., by bonding. In the case of a flanged joint at least one of the collars of the mating surface can be of the same composition as one or both of the flanges. However, each of the flanges, each of the collars as well as each of the conduits can be composed of different metals, if desirable. Most preferably, bolted flanges are employed to support and prevent differential movement of the collar members and the collars are of the same composition as are the flanges. The flange can be a separate assembly fitted around the conduit or the conduit terminals can be flanged. In the latter case, the collar members are integrally joined to the flanged terminals, whereas in the former case, the flange assembly can be physically maintained in abutment with the collar members.

The material forming both of the mating faces of the transition piping joint of this invention is metallic. Cladding can be used to form one of the mating faces, the other face being, for example, of the same composition as, and integral with the body of the flange or the tail piece or thread piece of the union.

Reference is made to the attached drawings illustrating the invention.

FIG. 1 is a sectional view of a flanged transition joint depicting one form of this invention wherein the transition piping joint is of the flanged type, and one of the mating facings and one or both of the weldable lips is of the same composition as one of the conduits.

FIG. 2 is a sectional view of a flanged transition joint depicting one form of this invention in which the metallic material forming the mating facings and weldable lips differs from the material comprising either of the conduits.

FIG. 3 is a sectional view of a flanged transition joint in which the metallic material forming the mating facings and weldable lips is the same as that material forming the flange facings, the flange facings, in turn, differing from that material composing the flange bodies.

FIG. 4 is a sectional view depicting a form of this invention as adapted to a union-type transition joint.

Referring now to FIG. 1, pipe or conduit 10 has affixed to it flange 11, and conduit 12, of a metallic material different from conduit 10, has affixed to it flange 13. These flanges may be any of the several types, such as slip on, welding neck, flat faced, raised face, ring joint, etc. The flanges are adapted to be bolted together by nuts and bolts, not shown, fitted through bolt holes 14 and 15, the bolts serving as a fastening mechanism for the joint. The flanges may have the same or a dissimilar coefficient of expansion; usually, however, these flanges will be composed of different metallic materials and will have different coefficients of expansion under the common temperature to which they are subjected.

Flange 13 has integrally clad or bonded to its surface 23 metallic material 17 which may be the same as that material of which the facing 24 of flange 11 is composed or which may be composed of any metallic material weldingly compatible to the material of which the facing 24 of flange 11 is composed.

Metallic cladding or bonding to flange facing 23 may be done in any of a number of ways. Weld depositing, for example depositing silver on stainless steel, may be used or the bonding may be done by explosive means. The latter procedure is preferably employed for metals such as tantalum, titanium, aluminum, zirconium or copper on stainless steel. In general, any means may be used which results in a commercially acceptable high strength bond being established between the two dissimilar metals.

Both flange 11 and flange 13 (including bonded member 17) describe lips 18 and 19 having mating facings 24 and 25, respectively. These lips are formed circumferentially to weldably incompatible conduits or pipes 10 and 12 and extend outwardly from the centerline of the conduits in a plane parallel to the mating facings of the flanges. Lips 18 and 19 terminate at their outer periphery within the bolt circle of the flanges 11 and 13, that is, at a point between the conduits 10 and 12 and the bolt circle of the flanges 11 and 13, and are joined together around their outer circumference by weld 22. In FIG. 1 gasket 16 is interposed between the mating facings 24 and 25.

Lips 18 and 19 may be formed in any manner. The curvature at the base of the lips is not critical and may be of any suitable radius. The lengths of lips 18 and 19 from their bases 20 and 21 to weld 22, as well as the thickness of the lips at any point are designed to allow flexibility in expansion and contraction, based upon the conditions of temperature to which the joint will be subjected and differences in coefficients of expansion between the welded lips can be tolerated. If desired, the lips can be composed of only one material and the minimum cladding on the face of flanges 11 and 13 can be adequate to supply the minimum dimension of lips 18 and 19 at their bases 20 and 21. In other words, the depth of either lip at its base would be no greater than the thickness of the cladding material at that point. However, it is to be understood that the lips can be composed of different material or of a composite material, e.g., an alloy, which could be clad or welded to the face of flanges 11 and 13. The cladding on the flanges need not comprise the minimum dimension of the lips. Alternatively, a separate metallic member could be welded to the cladding to form the lip having mating surfaces.

In FIG. 1, the metallic material of the mating facings is indicated as being identical, although the flange bodies are of two different materials. Various combinations are possible. For example, one of the flanges could be titanium having clad on its face an austenitic stainless steel and the other flange could be a high nickel alloy having clad on its face the same austenitic stainless steel. Alternatively, one of the flanges could be stainless steel having aluminum cladding and the other flange could be aluminum with an aluminum lip. In these instances the mating facings and lips would be formed of the same materials. It is evident, however, that materials of differing compositions may be used to form the mating facings and the lips which are weldable together. For example, one of the flanges could be titanium having clad on its face an austenitic stainless steel. The other flange could be high nickel alloy having nickel clad on its face. In this instance, the lips would be formed of different materials but of materials weldingly compatible.

In certain instances, there may exist no one metallic material weldable to the faces of both flanges. In this instance a third material, different in composition from the facings of either of the two flanges but bondable to both, is used to form the mating facings. This is shown in FIG. 2.

In FIG. 2, flange 31 on conduit 30 is faced with metallic material 32 which differs from material 35 forming the face of flange 34. Assuming no weldably compatible metallic substances are weldable to facing materials 32 and 35, metallic material 36 is bonded to members 32 and 35 to form the mating facings and weldable lips. Material 36 is bonded to materials 32 and 35, and in both instances is extended in the direction of bolt holes 40 and 41, beyond the outer peripheries of materials 32 and 35 to form mating facings 42 and 43 with extensions beyond flange facing 32 of flange 31 and flange facing 35 of flange 34. Gasket 38, if desired, is fitted between the two mating facings of common material 36 and a continuous weld 39 is provided around the periphery of lips 36 to provide a leak-proof joint when the flanges are bolted together.

Another embodiment of this invention is shown in FIG. 3. As shown, flanged conduit 45 and ring flange 49 form a Van Stone type of boltable flange having facing 47 of the same metallic material as conduit 45 but differing from boltable fastening device or ring flange 49. Conduit 46 has welded to it welding neck flange 50 having a facing of metallic material 48 which is of different composition than flange 50 but of the same composition as flanged conduit 45. Bonded to facings 47 and 48 are collars having mating facings 51 and 52 extended to form lips 53 and 54, respectively, all being of the same metallic material as facings 47 and 48. Lips 53 and 54 are then joined together around their outer periphery by seal weld 55 to provide a leakproof joint when the flanges are bolted together. If desired, a gasket may be interposed between mating facings 51 and 52.

FIG. 4 shows one form of this invention when applied to a piping union. Thread piece 61 describes the flanged portion of conduit 62 and tail piece 63 describes the flanged portion of conduit 64. The original facings 65 and 66 of the thread piece and tail piece are composed of dissimilar, non-weldable materials, e.g. titanium and tantalum are clad with mating facings 67 and 68 of the same composition, such as nickel or high nickel alloy and the mating facings are extended radially from conduits 62 and 64 to form lips 69 and 70. A ring or nut 71 is threaded to thread piece 61 at one end and, at the opposite end, 71 is in the shape of and L which engages tail piece 63 on the surface opposite the cladded surface in such a way as to hold portions 61 and 63 in abutment when the nut is tightened. The lips 69 and 70 terminate within the inside diameter of ring or nut 71 and are joined by seal weld 72, also within the inside diameter of ring 71, allowing the union to be made up by the engagement of ring 71 with the thread piece 61 to form the fastening mechanism for the joint in a usual manner. The joint may be used with or without gasket 73.

It will be seen that dismantling of the transition joints described herein is easily accomplished. The mechanical fastening device is loosened in the usual manner and the weld around the periphery of the lips of the mating surfaces is ground off to permit disassembly.

Any of the joints herein described may be used with or without a gasket. The gasket may be composed of a metallic or non-metallic material such as, for example, asbestos, aluminum, glass reinforced Teflon, rubber or steel. If the gasket is metallic and weldably compatible with the lips, it may be permitted to extend as far as the end of the lip and be welded along the lip edges. The gasket sealing force applied to the joint may be in any direction relative to the longitudinal axis of the conduit to which the joint is affixed, e.g., gasketed joints such as ring joints, lens joints and the like may be used.

It will be obvious to those skilled in the art that other variations can be made to the described embodiments of this invention without departing from its scope. For example, it is not necessary that the matching lips which are welded together around their outer periphery lie, at all points, in a plane, parallel to the face of the flange. For example, lips 18 and 19 in FIG. 1 can be inclined from the vertical plant to better accommodate differences in expansion between the lips.

Having thus described our invention, we claim:

1. In a method for joining oppositely disposed facings of tubular members wherein the tubular members are composed of weldably incompatible metallic materials which are materials whose respective melting points differ more than 20 percent, the improvement which comprises:
   (a) joining to the terminal facing of at least one of the tubular members by explosive bonding, a first collar member composed of a metallic material which is weldably incompatible with the tubular member, the collar material being independent of the coefficient of expansion of said tubular member and having an elongation of at least 3 percent;
   (b) aligning the first collar member with a second collar member correspondingly disposed on a second tubular member composed of a material which is weldably incompatible with the first tubular member, the first collar member and the second collar member being weldably compatible by reason of their having substantially similar percent elongation and having melting points which may vary by not more than 20 percent, irrespective of their coefficients of expansion;
   (c) joining the peripheries of the collar members by heating to weld the peripheries around the aligned collar edges; and
   (d) mechanically supporting the welded joint with a mechanical fastening member.

2. The method of claim 1 wherein said tubular members are conduits and wherein the collar members extend radially from the walls of said conduits and are welded together around the outer periphery of their radial extension.

3. The method of claim 2 wherein the second conduit and the second collar are composed of the same material.

4. The method of claim 2 wherein the second collar is bonded to the facing of the second conduit and is composed of a material different from that of either conduit.

5. The method of claim 2 wherein the conduits are flanged so that a collar is bonded to at least one of the flange surfaces and the flange minimizes differential movement between the mated surfaces of the collar members.

6. The method of claim 5 wherein the flanges extend radially outward from said conduits beyond and on either side of said collars and the flanges are mechanically united by the fastening device beyond the periphery of the collars in a manner so as to hold in abutment the collar surfaces.

7. The method of claim 2 wherein the collar members are composed of the same material.

8. The method of claim 5 wherein the flanges extend radially outwardly from said conduits beyond and on either side of said collars and the flanges are bolted together at a plurality of points beyond the periphery of the collars in a manner so as to hold in abutment the collar surfaces and wherein the flanges are bolted together at least at one point before at least a portion of the collars are welded.

9. The method of claim 1 wherein the second collar member is composed of the same material as the first collar member.

10. The method of claim 1 wherein the second collar member is welded to the second tubular member.

11. The method of claim 1 wherein the second collar member is bonded to the second tubular member.

12. The method of claim 1 wherein the tubular member and the first collar member are composed of different metallic materials and wherein one of the metallic materials is stainless steel and the material of the other member which is joined by explosive bonding is selected from the group consisting of copper, tantalum, titanium, aluminum and zirconium.

References Cited

UNITED STATES PATENTS

| | | | |
|---|---|---|---|
| 2,646,997 | 7/1953 | Magos et al. | 285—229X |
| 2,684,255 | 7/1954 | Abele et al. | 285—286X |
| 2,763,923 | 9/1956 | Webb | 29—472.1 |
| 3,188,116 | 6/1965 | Christensen | 285—286X |
| 3,311,392 | 3/1967 | Buschow | 285—173 |

FOREIGN PATENTS 335,286   9/1930   England.

JOHN F. CAMPBELL, Primary Examiner

R. B. LAZARUS, Assistant Examiner

U.S. Cl. X.R.

29—421, 471.1, 486